United States Patent [19]

Debortoli et al.

[11] 4,053,719
[45] Oct. 11, 1977

[54] CONNECTOR BLOCKS FOR TELECOMMUNICATIONS LINES

[75] Inventors: George Debortoli; Detlef Zimmermann, both of Ottawa, Canada

[73] Assignee: Northern Telecom Limited, Montreal, Canada

[21] Appl. No.: 736,174

[22] Filed: Oct. 27, 1976

[51] Int. Cl.² .............................................. H04M 3/22
[52] U.S. Cl. .................................. 179/98; 179/91 R; 174/60; 361/428; 339/18 R
[58] Field of Search ..................... 179/91 R, 91 A, 98, 179/1 PC; 339/18, 65, 150 B, 276 A; 361/425, 426, 428, 353; 174/60, 72 A

[56] References Cited

U.S. PATENT DOCUMENTS

| | | | |
|---|---|---|---|
| 3,518,611 | 6/1970 | Shores, Jr. | 361/428 |
| 3,736,387 | 5/1973 | Thompson et al. | 179/98 |
| 3,760,328 | 9/1973 | Georgopulos | 179/98 |
| 3,936,133 | 2/1976 | Splitt et al. | 361/426 |
| 3,947,732 | 3/1976 | Cwirzen | 361/426 |
| 4,012,096 | 3/1977 | DeLuca et al. | 361/425 |

*Primary Examiner*—Kathleen H. Claffy
*Assistant Examiner*—Gerald L. Brigance
*Attorney, Agent, or Firm*—Sidney T. Jelly

[57] ABSTRACT

A connector block for telecommunication lines comprises a unitary structure including a protector field section, a cross-connect field section and a test field section. The cross-connect field extends down one side of the protector field facing in a direction to that which the protector field faces. The test field is positioned on the corner of the junction between the protector field and the cross-connect field, being inclined to face in a direction intermediate that of the protector field and the test field. The protector field can have a metal casing and metal partitions defining protector positions and can serve as an electrical ground connection for the protectors. The protectors can have detents cooperating with formations on the protector field to provide for positive partial withdrawal position. One way insertion of protectors can also be provided. The cross-connect field can be arranged to pivot outwards for access to the rear parts of terminals in the cross-connect unit.

13 Claims, 12 Drawing Figures

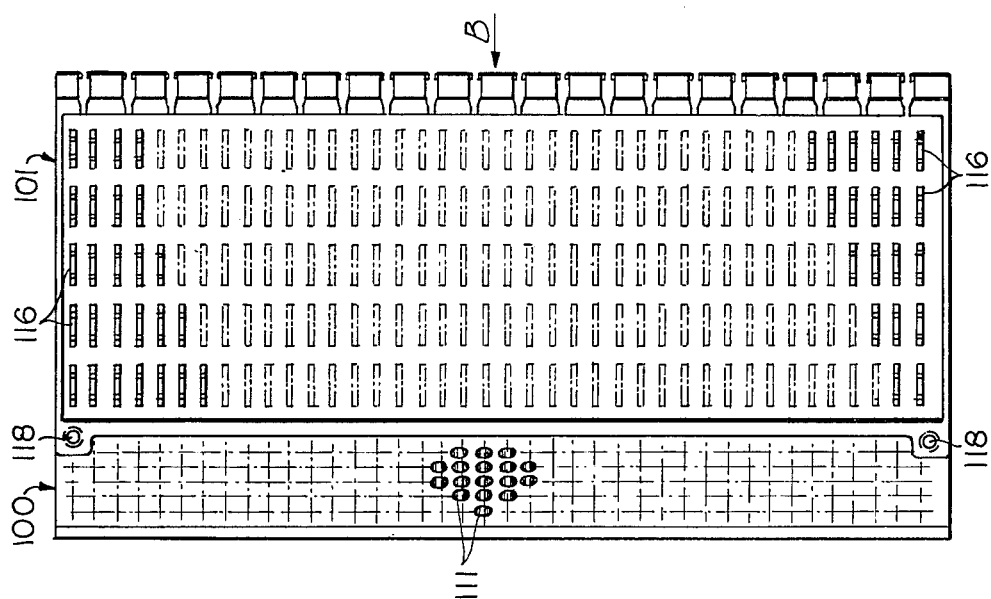
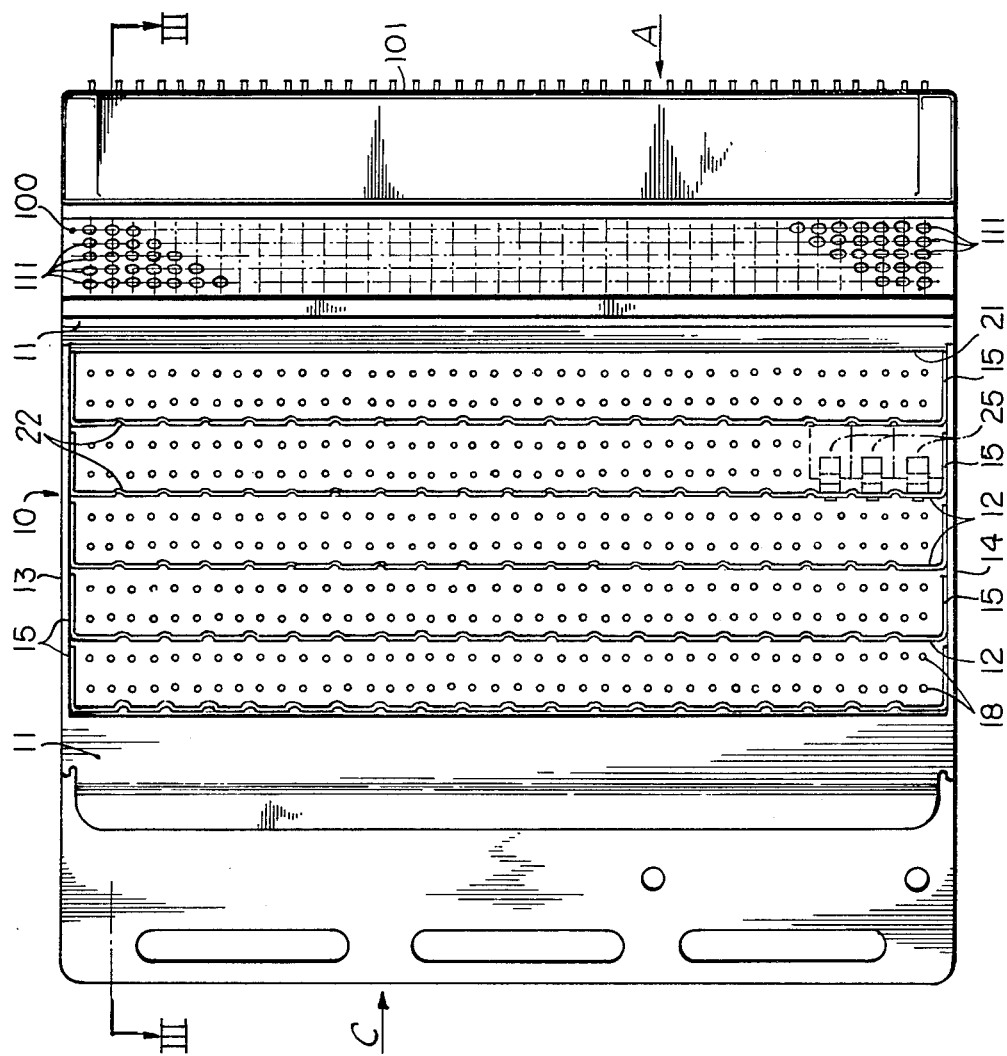

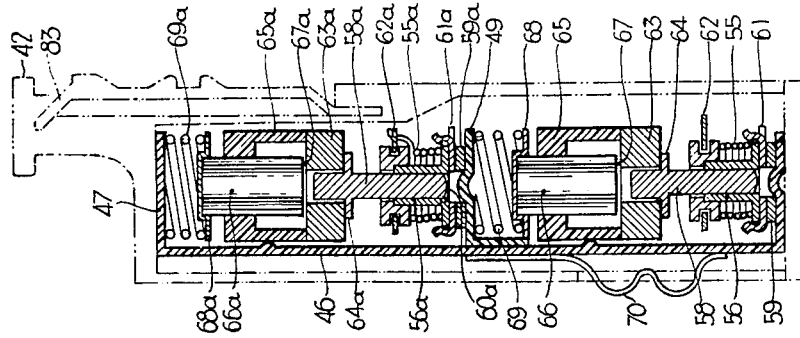
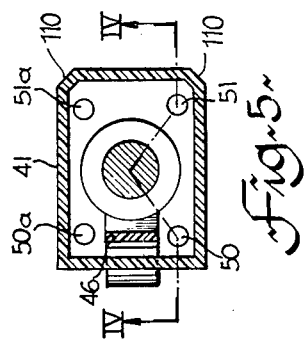
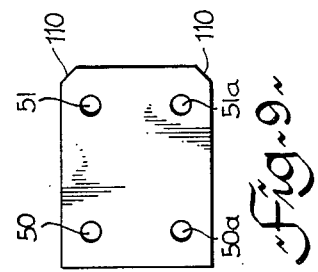
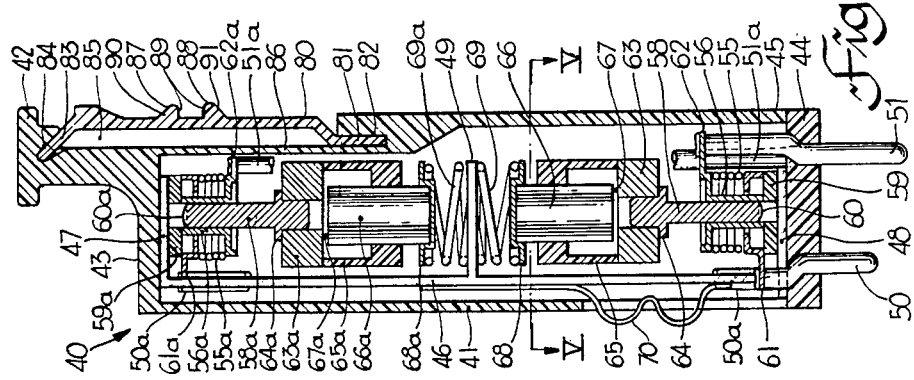

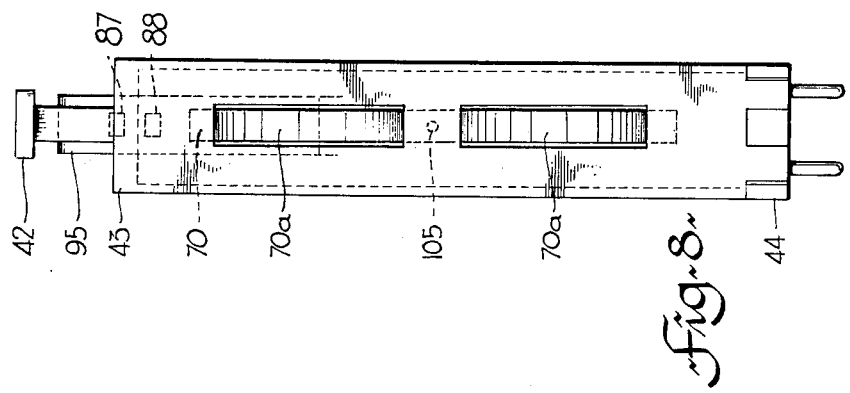
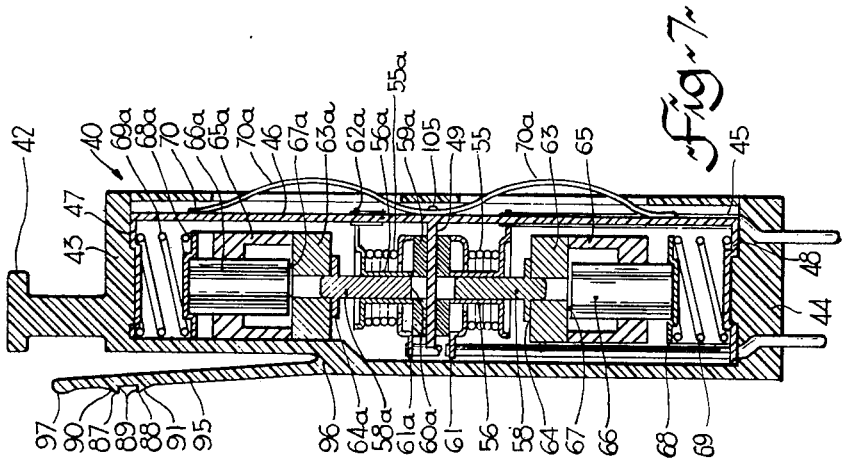

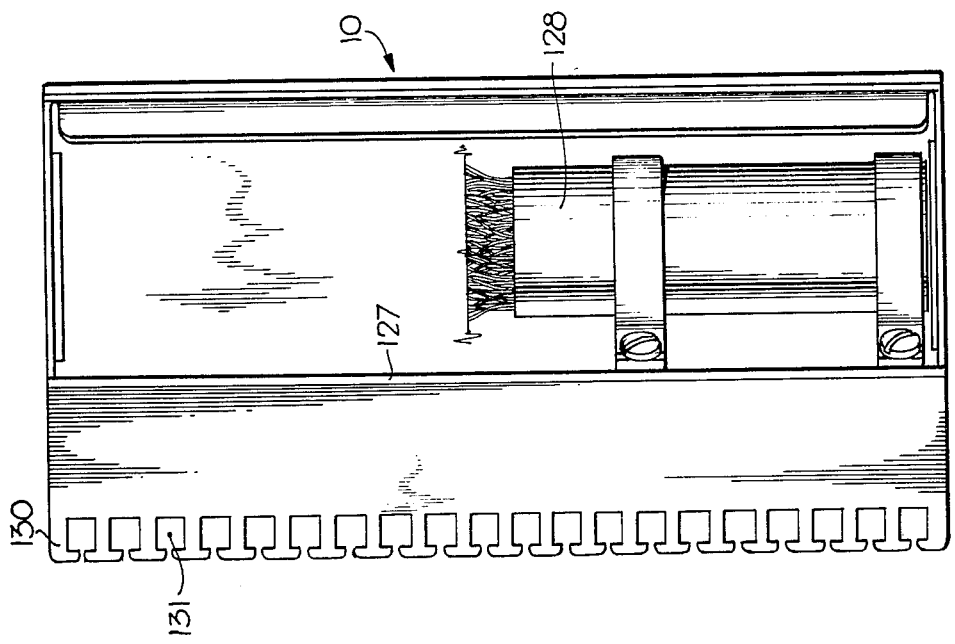
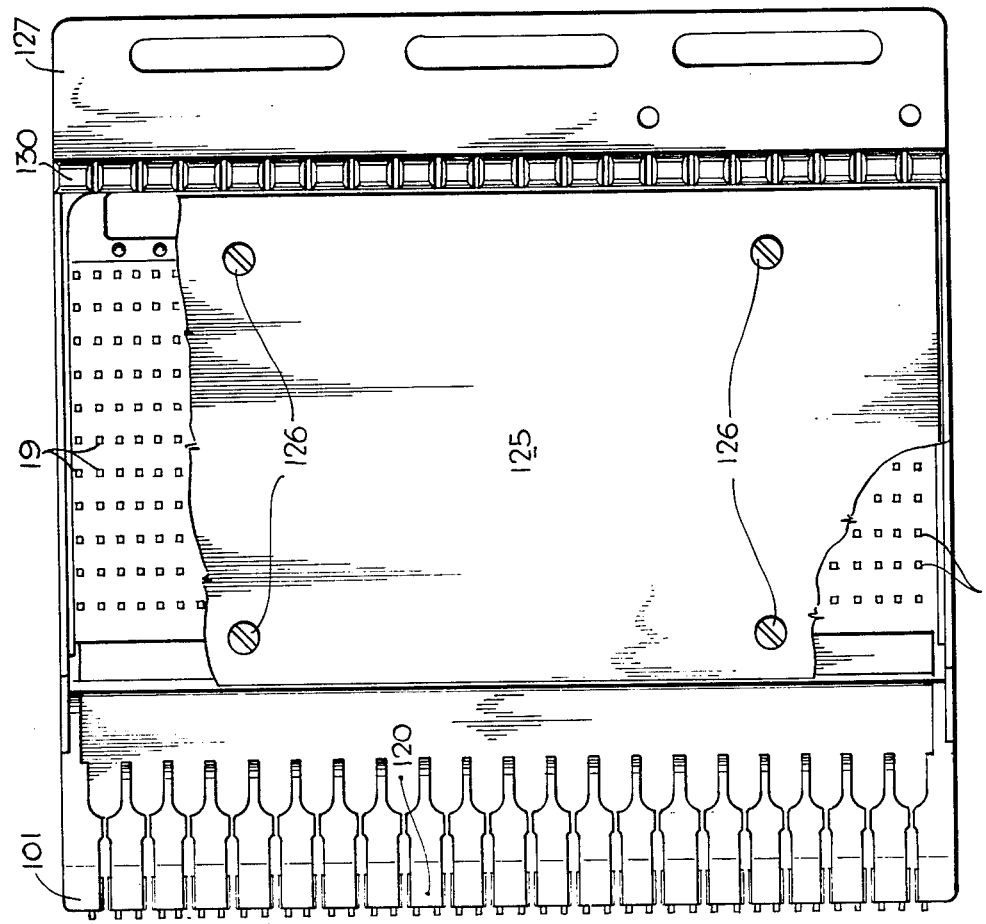

CONNECTOR BLOCKS FOR TELECOMMUNICATIONS LINES

This invention relates to connector blocks for telecommunications lines, and particularly to connector blocks for main frames in central offices.

It is a constant requirement that the space required for the various items of apparatus at central switching offices, and at other places, be reduced to a minimum. Generally, existing protectors comprising protector and test fields, because of their large dimensions, and to obtain proper frame balance, were placed on a separate frame. The present invention provides a connector block which houses the protector field, the test field and the cross-connect field. By this means, the protector-connector unit and cross-connect block is all mounted on one frame instead of two, and further, the overall dimensions of the protector-connector block or unit is very close to that of a conventional quick-clip terminal connector block. Thus, on one frame, approximately the same number of connector-protector blocks can be mounted as conventional quick-clip terminal connector blocks, providing the saving of a frame and associated hardware which normally mounted the protector units, as well as operational savings.

A connector block, in accordance with the present invention comprises three sections or fields: the protector field, the test field and the cross-connector field. The protector field mounts a plurality of protectors which protect the central office equipment, and outside plant equipment, against line surges and the like, particularly overvoltage and overcurrent situations. The test field provides the facility of testing outside plant cable pairs and the cross-connect field provides for termination of cross-connection jumper wires from central office equipment connectng blocks.

The invention will be readily understood by the following description of an embodiment, by way of example, in conjunction with the accompanying drawings, in which:

FIG. 2 is a front view of the protector field of the block of FIG. 1;

FIG. 4 is a longitudinal cross-section through one form of protector, on the line IV—IV of FIG. 5;

FIG. 5 is a cross-section on the line V—V of FIG. 4;

FIG. 6 is a longitudinal cross-section similar to that of FIG. 4, through another form of protector;

FIG. 7 is a longitudinal cross-section similar to that of FIG. 4, through a further form of protector;

FIG. 8 is a side view of a protector as in FIG. 7;

FIG. 9 is a base plan view of a protector, as in FIG. 4, 6 or 7;

FIG. 10 is an end view, in the direction of arrow A in FIG. 2 of the cross-connect field;

FIG. 11 is a back view in the direction of arrow B in FIG. 10, with a cover partly broken away to show terminals;

FIG. 12 is a further end view, in the direction of arrow C in FIG. 2.

Figure 1:
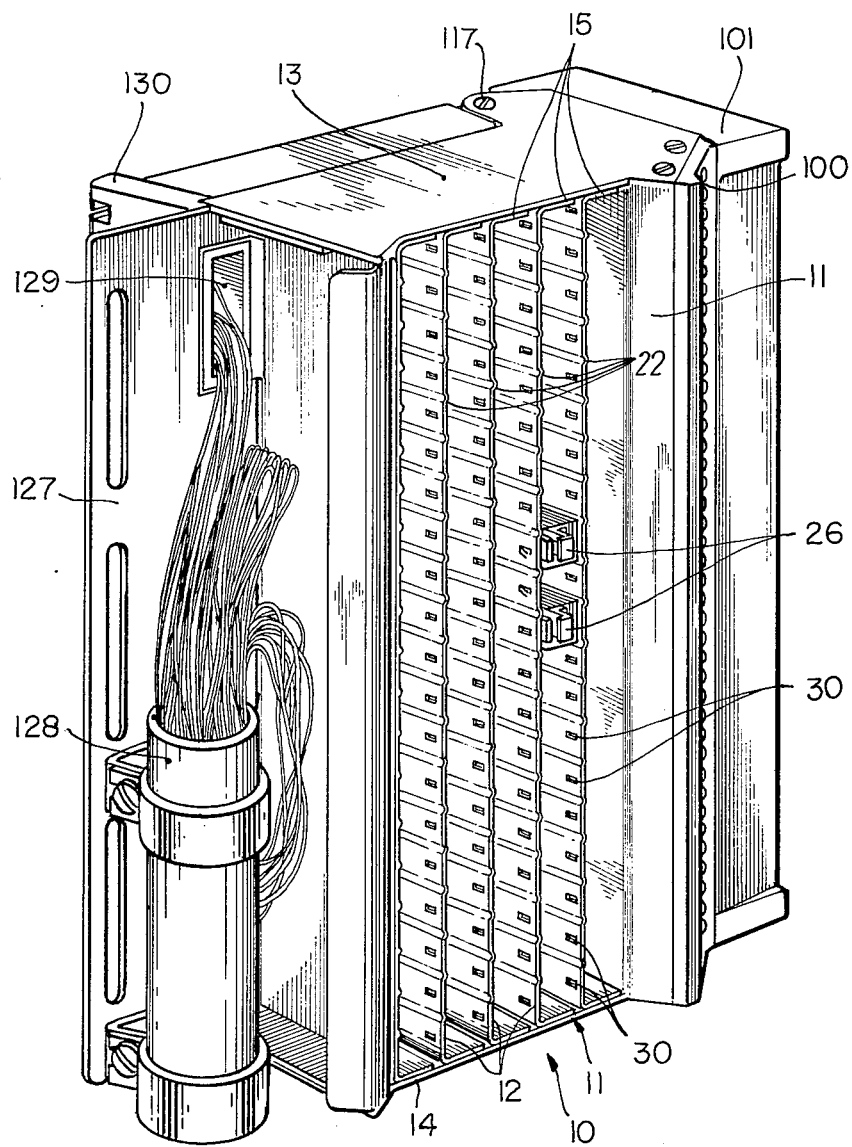
FIG. 1 is a perspective view of a connector block, showing the protector field.
Figure 3:
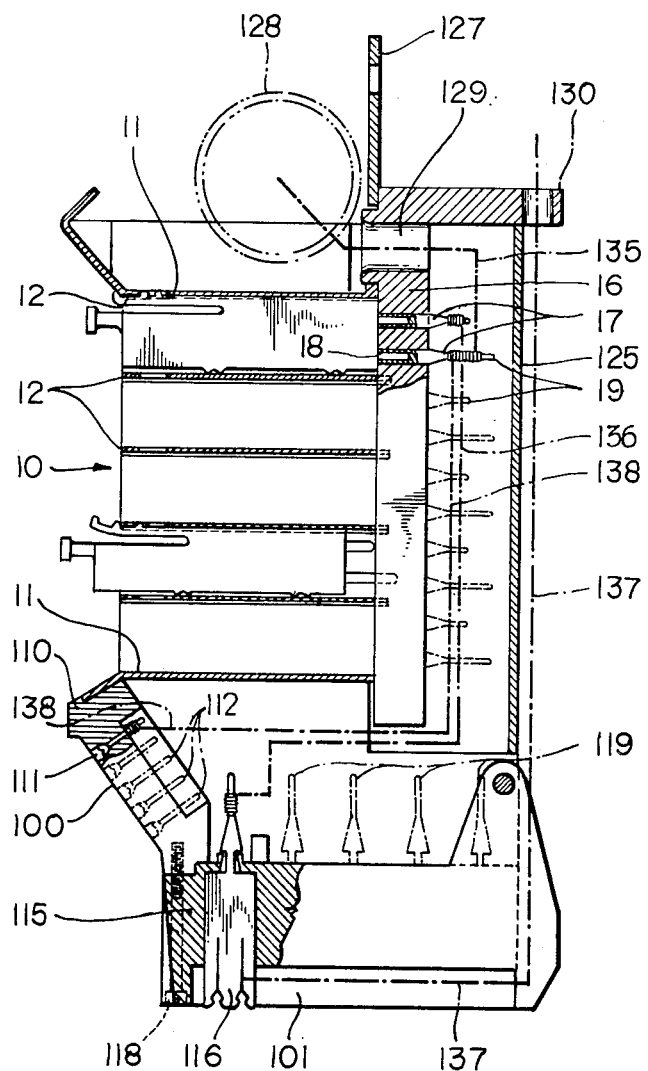
FIG. 3 is a cross-section on the line III—III of FIG. 2.

As illustrated in FIGS. 1, 2 and 3, the protector field indicated generally at 10, has a metal case 11 divided into a number of columns by metal dividers 12. The metal dividers are conveniently spot welded, or brazed, to the top and bottom end members 13 and 14 by end flanges 15 on the dividers. The back of the protector field is closed by a plastic member 16. Inserted into the member 16 are a plurality of terminals 17. The terminals extend through the plastic member 16, the forward ends 18 in the present example being hollow for the reception of contact pins extendng from protectors and the rearward ends 19, again in the present example, adapted for wire wrapping of conductors thereto.

In the particular embodiment illustrated, four terminals 17 are provided for each protector position although differing numbers of terminals can be provided. A protector position is defined, for four columns by spaced dividers 12, while a fifth column is defined by a divider 12 and the side wall 21 of the case 11. The dividers have guide formations 22 formed therein which divide a column into separate positions for protectors. The guide formations 22 also cooperate with the shaping of the protectors to ensure that the protectors are inserted correctly. In the example illustrated in FIG. 2, there are five columns of twenty rows, that is one hundred protector positons. Three protectors are indicated in chain dotted outline at 25 in FIG. 2, while two protectors, 26, are shown inserted in FIG. 1.

To assist in determination of related terminals, and to make connection easier, the terminals 17 are of two different lengths. Thus as seen in FIG. 3 the rearward ends 19 of one pair of terminals — conveniently the central office wire terminals — are shorter than the rearward ends of the other pair — which would be the outside plant wire terminals, for each protector position.

Formed in the dividers 12 are apertures 30, an aperture for each protector position. The apertures are positoned adjacent the outer edges of the dividers 12 and cooperate with detent means on the protectors 26.

Typical forms of protectors are illustrated in FIGS. 4 to 9, and are also described in copending application Ser. No. 736,173.

In the example illustrated in FIGS. 4 and 5, a protector indicated generally at 40 comprises a molded plastic housing 41 having a knob 42 at the closed outer end 43 and a base 44 attached to the inner end 45. Extending the length of the housing between closed end 43 and inner end 45 is a metal ground and retaining bar 46. Ground bar 46 has end webs extending acorss the housing, normal to the axis of the housing, as indicated at 47 and 48, and also a central web 49 extending across the housing midway between the end webs 47 and 48. Four pins extend through the base, forming two pairs 50 and 50a, 51 and 51a. Pins 50 and 50a are shorter than pins 51 and 51a, and comprise the connections to the central office. Pins 51 and 51a connect to the outside plant. One pin of each pair, pins 50a and 51a in FIG. 4, connect to protection devices positioned between the central web 49 and the end web 47 of the ground bar 46, and the other pair of pins, 50 and 51, connect to protection devices positioned between the central web 49 and the end web 48 of the ground bar 46. Pins 50a and 51a extend up through the casing but are not shown in full in FIG. 4 for clarity.

The protection devices form two sets, each set having a current overload protector and a voltage overload protector. In the particular example illustrated, considering first the section between end web 48 and central web 49, an overcurrent protection device in the form of a heat coil 55 rests on the end web 48. The heat coil, comprising a predetermined length of insulated wire, is wound on a metal bobbin 56 having a central bore in which is soldered a metal pin 58, the solder having a predetermined melting range. An insulating washer 59 is positioned between the bobbin 56 and the web 48, and the end 60 of the pin is held spaced from the web 48. One end of the coil 55 is attached to pin 50, via tab 61 and the other end of the coil is attached to pin 51 via tab 62.

The pin 58 extends from the heat coil 55 and in the present example carries a carbon ring 63 which rests on a flange 64 on the pin 58. A ceramic tube 65 rests on the carbon ring 63 and holds a carbon rod 66. A small gap 67 is provided between the opposed ends of the carbon ring 63 and the carbon rod 66. On the end of the carbon rod 66 remote from the carbon ring 63 is positioned a metal cap 68 and a compression spring 69 extends between the cap 68 and the central web 49.

A similar arrangement exists between end web 47 and central web 49 and the same references are applied to the same details, with the suffix "a" thereafter.

The operation is as follows. With a normal line current and voltage, there is a direct connection between pin 51(51a) and pin 50 (50a) via the heat coil 55 (55a). With normal current and voltage no undue heating of the coil occurs. However, on occurrence of an overcurrent condition, on one or other or both lines, heating of the related heat coil 55 (55a) occurs. Melting of the soldered joint between bobbin 56 (56a) and pin 58 (58a) results and the pin 58 (58a) is pushed by the spring 69 (69a) via carbon rod 66 (66a), ceramic tube 65 (65a) and carbon ring 63 (63a). The end 60 (60a) of the pin contacts the related end web 48 or 47 of the ground bar 46. There is thus provided a direct path from pin 51 (51a) to ground via the metal bobbin 56 (56a) and the pin 58 (58a). The ground bar 46 is electrically connected to an electrical ground by means of a ground spring 70 attached to the round bar 46.

For an overvoltage condition, on one or the other line, or both lines, arcing occurs across the related gap, or gaps 67, 67a. In this case there is thus provided a path from pin 51 (51a) via metal pin 58 (58a), carbon ring 63 (63a), gap 67 (67a), carbon rod 66 (66a), end cap 68 (68a), and spring 69 (69a) to the central web 49 and thus to the ground bar 46 and ground spring 70. A short term overvoltage will merely result in the arcing across the gap 67 (67a) for the time of the overvoltage, for example during a voltage surge. However if an overvoltage occurs for an extended period heat from the carbon assembly will be transferred to the pin 58 (58a), melting the solder joint between the metal bobbin and the pin with resultant release of the metal pin 58 (58a).

It is often desired that partial disconnection is required. For example if a particular pair of lines is to be disconnected from the central office — to remove service from a terminal for example, disconnection from the central office is effected but protection of the outside plant lines is still required. This is obtained, conventionally, by partial withdrawal of the protector. One pair of pins — the outside plant pins — are usually longer than the other pair. This is seen in FIG. 4 where the pins 51, 51a, are the outside plant pins and are longer than the central office pins 50, 50a.

In many instances this partial withdrawal is not positive, in that the protector can be withdrawn too far — with no protection for the outside plant lines, or not withdrawn far enough, leaving the particular terminal still connected. Further, in the confined space in a connector unit, a partially withdrawn protector can easily be knocked, the protector then being pushed in, or falling out.

The protector of the present invention is provided with a detent member which locates positively with a hole in the connector unit. A flexible elongated member 80 is positioned on one side of the protector at the outer end. In the particular example illustrated in FIG. 4 the inner end 81 of the member 80 fits in a groove or slot 82 formed in the housing 41. Similarly the outer end 83 of the member 80 fits in a further groove or slot 84 in the knob 42. There is a clearance space 85 between the main portion of the member 80 and the adjacent wall portion 86 of the housing 41. At a mid portion of the member 80 are two outwardly extending ribs 87 and 88 spaced a short distance apart. In the particular example the opposed faces 89 of the ribs are substantially normal to the axis of the member 80 while the outer faces 90 and 91 are inclined, giving the ribs 87 and 88 a somewhat wedgeshaped cross-section.

The protector is inserted in a protector section of a connector unit or block. A particular example is one described and illustrated in copending application no. Conveniently the protector section is of metal sheet positioned to provide a plurality of tubular receptacles in each of which a protector can be inserted. As the protector section is of metal the grounding springs 70 can be in direct contact with the metal protector section which in turn is connected to a ground connection. However it is possible to provide alternative grounding means in the protector section such as if the protector section is of a non-conducting material, or for other reasons.

In one wall of each opening, suitable holes are formed through which the ribs 87 and 88 can project. On initial entry of a protector into a receptacle the protector is pushed and the long pins 51, 51a enter related sockets. At this time and position the member 50 is deflected to enable the innermost rib 88 to enter the receptacle and then spring out with the rib 88 in a first hole. This deflection is assisted by the inclined surface 91. To fully insert the protector the member 80 is depressed, releasing the rib 88 and the protector pushed in fully. The shorter pins 50 enter related sockets and the ribs 87 and 88 each enter a hole in the wall of the receptacle, rib 87 being in the hole into which rib 58 previously fitted.

To partially withdraw a protector it is only necessary to pull on the knob 42. The inclined surface 90 of the rib 87 deflects member 80 inwards and the ribs 87 and 88 move out of the related holes. As soon as rib 88 is opposite the outer hole the member 80 springs outward and rib 88 enters the hole. Further outward movement is prevented by the face 89 on the rib 88 which acts as an abutment. Accidental movement in either direction is prevented by the faces 89. For complete withdrawal of a protector it is necessary to press the member 80 inwards to disengage the rib 88 from the hole. There is thus a positive location for partial withdrawal. The protector cannot be accidentally withdrawn completely, and once partially withdrawn is held securely in that condition against accidental reinsertion, or complete withdrawal.

FIGS. 6 and 7 illustrate alternate forms of protector. FIG. 6 is very similar to FIG. 5 and only the interior of the protector is shown, the housing omitted. The major difference in FIG. 6 is that instead of the heat coils 55, 55a, being at opposite ends, with the overvoltage protection devices between them on either side of the central web 49, the arrangement in each section of the protector is the same. Thus heat coil 55 rests on the inner web 48, insulated therefrom by the insulating washer 59, and metal pin 58, carbon ring 63, ceramaic tube 65, carbon rob 66, end cap 68 and spring 69 extending between the heat coil and the central web 49. However for the outer section, heat coil 55a rests on the central web insulated therefrom by the washer 59a, and the pin 58a, carbon ring 63a, ceramic tube 65a, carbon rod 66a, end cap 68a and spring 69a extend in that order between the heat coil and the outer end web 47. Also, the central web is shown as a separate member attached to the main portion of the ground and retaining bar 46, although this is shown only to illustrate an alternative form of construction.

FIG. 7 illustrates an alternative form of ground spring 70. Ground bar 46 is as in FIG. 4 with an integral central web 49 extending normal to the main portion. Also, the positions of heat coils 55, 55a and the overvoltage devices are reversed as compared with FIG. 4 and a different form of detent is illustrated.

The ground bar 46 contains all the components. All the loadings, for example by the springs 69, are carried by the ground bar and are not transmitted to the plaster casing. This is particularly desirable in overheating situations as the ground bar willl not distort readily whereas the plaster casing can melt or soften.

The detent 95 is formed integral with the housing 41 and is cantilevered therefrom. Thus, as illustrated in FIG. 7, the detent is molded as part of the housing 41 being hingedly attached at its inner end 96 and extending outwards to end approximately at the level of the knob 42. In this instance the outer end 97 of the detent is free of the housing. Similar ribs 87 and 88 are formed on the detent 95 as in the form illustrated in FIG. 4 and the action for locating the protector in the partially withdrawn and fully inserted conditons is the same. The ground spring 70 extends for substantially the full length of the ground bar 46, having two arcuate portions 70a extending through apertures in the protector housing. This gives improved heat conductance to the protector section of the connector unit. The spring is spot welded to the ground bar 46 at 105.

FIG. 8 is a side view of the form of protector illustrated in FIG. 7, particularly showing the detent 95 and the ground spring contact 70. FIG. 9 is a plan view of a base of a protector, showing the pin positioning and is typical of the arrangement for all forms of protector. Also seen is the shaping of the protector — at 110 — for cooperation with the formations 22.

As previously stated, the protector field is used in combination with a test field and a cross-connect field to provide a combination unit.

FIGS. 10 to 12 illustrate a complete connector block including the protector field of FIGS. 1, 2 and 3 and a test field — indicated generally at 100 — and cross-connect field indicated generally at 101. These also appear in FIGS. 1, 2 and 3.

The test field 100, as seen in plan view, is angled complementary to the protector field, and the cross-connect field 101 is at one side of the combination unit extending at right angles to the protector field. The test field is also angled complementary to the cross-connect field, being positioned at a junction between the protector field and the cross-connect field.

The test field provides test point access to all the outside plant cable pairs and is wired in parallel with the cable pairs. It comprises a molded plastic block 110 containing, in the present example, two hundred recessed test contacts 111 at the front and the same number of wire wrap terminals 112 at the rear, each related contacts 111 and terminal 112 forming a unitary member which can be molded in or pressed in the block 110. The contacts, and terminals, are arranged in forty horizontal rows (twenty pairs) of five contacts per row. Two contacts 111, and their related terminals 112, are provided for each protector position in the protector field. Also each pair of contacts 111, and related terminals 112 are directly related to cooperative terminals in the cross-connect field. Typical wiring of the various fields will be described later in relation to FIG. 3. A test probe can be inserted into any of the contacts 111 to test continuity of the outside plant lines. Individual or bulk testing can be done, with the appropriate equipment.

The cross-connect field 101 comprises a molded plastic terminal block 115 in which are positioned two hundred insulation slicing terminals 116. The terminals in the present example are of the form as in U.S. Pat. No. 3,521,221 dated July 21, 1970 and have three beams providing two channels or slots for wires. The terminals are arranged in rows of five terminals each.

The block 115 is pivotted at one side by pivots 117, the top one of which is seen in FIG. 1. The block is held closed by screws 118 which screw into the block 110 of the test field. When the cross-connect field is opened, access is available to the rear ends 119 of the terminals 116 which are adapted for wire wrapping. Each terminal has perceptual movement in the block 115 for ease of wire tracing. A fanning strip 120 (FIG. 11) extends along the side at which the block 115 pivots, and has twenty slots. Each slot has a constructed opening and the wires must be forced slightly through the opening to enter the slot and thus be positively retained.

A cover 125 is attached to the rear of the protector field, by screws 126. Removal of the cover provides access to the rear ends 19 of the terminals 17 in the protector field. At the side of the complete unit remote from the cross-connect field, a web 127 extending from the side of the protector field casing provides a mounting for a cable end 128. Apertures 129 permit passage of conductors from the cable into the rear of the protector field for connection to the rear ends 19 of the terminals 17.

A further fanning strip 130 is positioned at the rear of the protector field, extending down one side and adjacent to the web 127. This fanning strip also has twenty apertures or slots 131 with constricted openings and serves to hold jumper wires from the terminals 116 in the cross-connect field.

A typical wiring pattern or circuit is diagrammatically illustrated in FIG. 3. It should be appreciated that wires are in pairs and in FIG. 3 the wires of a pair are vertically spaced so that, in looking down, as in FIG. 3 only one wire of a pair is seen.

Starting from the cable end or stub 128, a pair of wires 135, outside plant wires, passes through an aperture 129 and is connected, as by wire wrapping, to the rear ends 19 of two terminals 17 of one protector position. The particular terminals are the longer of the two pairs for the protector position and are the terminals to which the outside plant pins of the protector position and are the terminals to which the outside plant pins of the protector connect. The circuit is then through the protector to the other pair of terminals 17 at that protector position. From these terminals wires 136 run to the rear ends 119 of a pair of terminals 116 in the cross-connect field 101. From the front ends of these terminals jumper wires 137 for connection to the central office equipment. A further pair of wires 138 runs from the rear ends 19 of the terminals 17, to which are connected the wires 135, to two of the terminals 112 in the test field 100. This connects the two related contacts 111 to the outside plant wires 135.

In position in a frame, the cross-connect field 101 usually faces forward.

What is claimed is:

1. A connector block for telecommunications lines, comprising three sections in a unitary structure, including a protector field, a cross-connect field and a test field, said protector field comprising a rectangular housing having opposed sides, top and bottom, a plurality of partitions extending longitudinally in said housing in spaced apart parallel array and means on said partitions to define a plurality of protector positions extending in a column between each two adjacent partitions, a back member in said housing, and terminals extending through said back member and each terminal including front portions for connection to a protector inserted in a protector position and rear portions for connection of conductors thereto, said terminals including two outside plant terminals for connections to outside plant equipment and two central office terminals for connection to central office equipment;

said cross-connect field extending down one side of said protector field and extending parallel to said side, and comprising an electrically insulated terminal block spaced from and parallel to said side of said protector field and extending longitudinally down said side, and a plurality of terminals extending through said terminal block, and including a terminal for each outside plant terminal and a terminal for each central office terminal in said protector field, each terminal including a forward part for connection of a jumper wire connection to a central office and a rearward part for connection of a conductor from a central office terminal in said protector field;

said test field attached at one side to said one side of said protector field at a forward edge thereof and comprising an insulating member extending longitudinally of said protector field and inclined outwardly and rearwardly thereof to connect at its other side to said terminal block of said cross-connect field, and terminals extending through said member, a terminal for each outside plant terminal of said protector field, each terminal including a rear portion for connection of a conductor from a related outside plant terminal and a front portion for acceptance of a test lead.

2. A connector block as claimed in claim 1, said cross-connect field pivotally attached at a rear part to said protector field, for pivotal movement and said insulating member of said test field outward and rearward for access to said rear portions of said terminals.

3. A connector block as claimed in claim 2, including a web extending from the side opposite to said one side, said web extending normal to said side, and mounting means for a cable end on said web.

4. A connector block as claimed in claim 1, including formations on said partitions in said protector field, said formations defining said protector positions.

5. A connector block as claimed in claim 4, said formations on adjacent partitions cooperative to provide one way insertion of said protectors.

6. A connector block as claimed in claim 1, said housing and said partitions of said protector field being of electrically conducting material, to provide electrical ground connections for said protectors.

7. A connector block as claimed in claim 1, said partitions including formations at each protector position for cooperating with means on said protectors to provide predetermined partial withdrawal positions for said protectors.

8. A connector block as claimed in claim 6 including a plurality of protectors in said housing each said protector comprising:

an electrically insulating housing;

a metallic ground bar extending substantially the length of the housing, said ground bar including first and second end webs extending normal to the longitudinal axis of said housing, a web at each end of said ground bar, and a central web extending from the center of the ground bar normal to said axis;

a first protection device extending between said center web and said first end web and a second protection device extending between said center web and said second end web;

each of said protection devices comprising an overcurrent device and an overvoltage device on a common axis parallel to said axis of said housing;

two pairs of pins extending from a base of said housing, each pair composed of an outside plant pin for connection to outside plant equipment and a central office pin for connection to central office equipment;

said overcurrent device in said first protection device connected between one pair of outside plant and central office pins, said overcurrent device in said second protection device connected between the other pair of outside plant and central office pins;

said overvoltage device in said first protection device connected between one of said outside plant pins and said ground bar and said overvoltage device in said second protection device connected between the other of said outside plant pins and said ground bar;

ground means connected to said ground bar for connection to a ground connector;

the arrangement such that actuation of an overcurrent device directly connects the related outside plant pin to said ground bar, and actuation of an overvoltage device directly connects the related outside pin to said ground bar.

9. A connector block as claimed in claim 8, said outside plant pins exending from said base of said housing longer than said central office pins, and means on said protector to predetermine the insertion position of said protector to only connect said outside plant pins to said outside plant equipment at one insertion condition and to connect said outside plant pins to said outside plant equipment and said central office pins to said central office equipment.

10. A connector block as claimed in claim 8, each said protector adapted for positioning in a protector field of a connector unit, said ground means connected to said ground bar comprising a spring member for contacting said metallic housing.

11. A connector block as claimed in claim 8, each said means for predetermining the insertion of said protector comprising a detent on said protector for engagement with a cooperative formation on said protector field.

12. A connector block as claimed in claim 8, said overcurrent devices each comprising:

a coil, wound on a metal bobbin;

a metal pin extending through said bobbin and soldered thereto, said coil positioned against one of said end webs and said central web of said ground bar, said metal bobbin insulated from said one web and an end of said metal pin spaced from said one web; and spring means acting on the other end of said pin, the arrangement such that on overheating of said coil and melting of said solder, said pin is moved into contact with said ground bar, said metal bobbin also connected to the related outside plant pin.

13. A connector block as claimed in claim 12, said overvoltage device positioned between said the other of said one of said end webs and said central web and said overcurrent device, said overvoltage device resting at one end on said other end of said pin, said spring means acting on the other end of said overvoltage device, the arrangement such that on breakdown of the overvoltage device, said overcurrent device overheats and releases said pin to connect said overload device to said ground bar.

* * * * *